(12) United States Patent
Solheim et al.

(10) Patent No.: US 7,190,902 B2
(45) Date of Patent: Mar. 13, 2007

(54) WAVELENGTH EXERCISER

(75) Inventors: Alan Glen Solheim, Stittsville (CA); Kevan Peter Jones, Kanata (CA)

(73) Assignee: Lucent Technologies Inc., Murray Hill, NJ (US)

( * ) Notice: Subject to any disclaimer, the term of this patent is extended or adjusted under 35 U.S.C. 154(b) by 821 days.

(21) Appl. No.: 10/021,709

(22) Filed: Dec. 12, 2001

(65) Prior Publication Data
US 2004/0208504 A1 Oct. 21, 2004

(51) Int. Cl.
*H04J 14/00* (2006.01)
(52) U.S. Cl. .............................. 398/69; 398/16; 398/25
(58) Field of Classification Search ................. 398/16, 398/25, 27, 34, 48, 49, 69
See application file for complete search history.

(56) References Cited
U.S. PATENT DOCUMENTS 6,005,696 A * 12/1999 Joline et al. ................... 398/25
6,069,718 A * 5/2000 Khaleghi ....................... 398/27
6,317,231 B1 * 11/2001 Al-Salameh et al. ........... 398/34

* cited by examiner

*Primary Examiner*—David C. Payne

(57) ABSTRACT

A wavelength exerciser is used for evaluating connections in an agile network. The exerciser operates at some or all switching nodes of the network, by first detecting the paths available between the respective node and all remaining nodes. For each available path, the exerciser selects some or all wavelengths that can carry the traffic all the way along the path. It can operate both during SLAT and/or during network normal operation. When the network carries live traffic, the wavelengths used on the test connections are wavelengths that are not used at the respective moment by the user traffic. The exerciser verifies the switch architecture and the access architecture, and also collects information about the performance of all paths, so as to speed-up the path-connection matching process and to increase the chances of successfully establishing the connection along the selected path.

18 Claims, 3 Drawing Sheets

WAVELENGTH EXERCISER

RELATED PATENT APPLICATIONS

U.S. patent application "Architecture For A Photonic Transport Network", Roorda et al., Ser. No. 09/946,576, filed Jun. 7, 2001 and assigned to Innovance Networks.

FIELD OF THE INVENTION

The invention resides in the field of optical WDM networks, and is directed in particular to a wavelength exerciser.

BACKGROUND OF THE INVENTION

In agile photonic networks, each signal travels between a different source and destination node without unnecessary OEO conversions at all intermediate nodes. In other words, the conventional pt-pt based channel boundaries are replaced by individual wavelengths (channels) going on-ramp and off-ramp at arbitrary network nodes.

Fault detection mechanisms which operate traditionally in the electrical domain cannot be applied in optical domain. Also, traditional network engineering methods cannot be used on end-to-end connections that pass through many nodes without OEO conversion, since the connections sharing a given fiber link now have substantially different noise and distortion impairments, determined by their network traversing history.

On the other hand, the agile architecture creates the opportunity to replace the existent fault detection mechanisms and the current methods of engineering connections with new link engineering methods.

SUMMARY OF THE INVENTION

It is an object of the invention to provide a fault detection mechanism for a flexibility point of an agile network.

It is another object of the invention to provide a method of measuring the current link/path performance parameters, for speeding-up the path selection process and increasing the chances of establishing a connection along the selected path.

According to an aspect of the invention, a method for evaluating connections in an agile network is provided, comprising: (a) for a switching node of the agile network, selecting a plurality of paths available between the switching node and all remaining nodes of the agile network; (b) for an available path, selecting a plurality of adequate (i.e., selected) wavelengths according to a wavelength performance parameter; (c) for each selected wavelength, establishing the test connection along the path; and (d) at preset intervals, repeating step (c) for all selected wavelengths, repeating steps (b) and (c) for all available paths, and repeating steps (a), (b) and (c) for all nodes of the agile network.

A network and element management system for a wavelength switched optical network is also provided. The network and element management system comprises at a switching node, a wavelength exerciser for detecting a test path between the switching node and another switching node; and a call management module for setting up a connection along the test path.

According to a further aspect the wavelength exerciser according to the invention comprises a path selector for selecting a test path between a source node and a destination node; a wavelength assignment module for assigning successively a plurality of wavelengths to the test path for establishing a test connection along the test path; a fault finder for detecting a fault whenever the test connection fails; and a test connection controller for controlling operation of the path selector, the wavelength assignment module and the fault finder.

Advantageously, the wavelength exerciser according to the invention provides a solution for detecting faults in the switch and access architectures before the network attempts to establish a connection along the faulted route. The wavelength exerciser may be used off line to detect faults in the switch during SLAT (system line-up and test) or can be used on-line to verify the paths that are not currently used for live connections.

Also, the wavelength exerciser can be used for collecting on-line measurements of link parameters. This measured performance data may be used for enhanced link engineering, and also for speeding-up the operation of the routing and switching in agile networks.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION OF THE PREFERRED EMBODIMENTS

Figure 1:
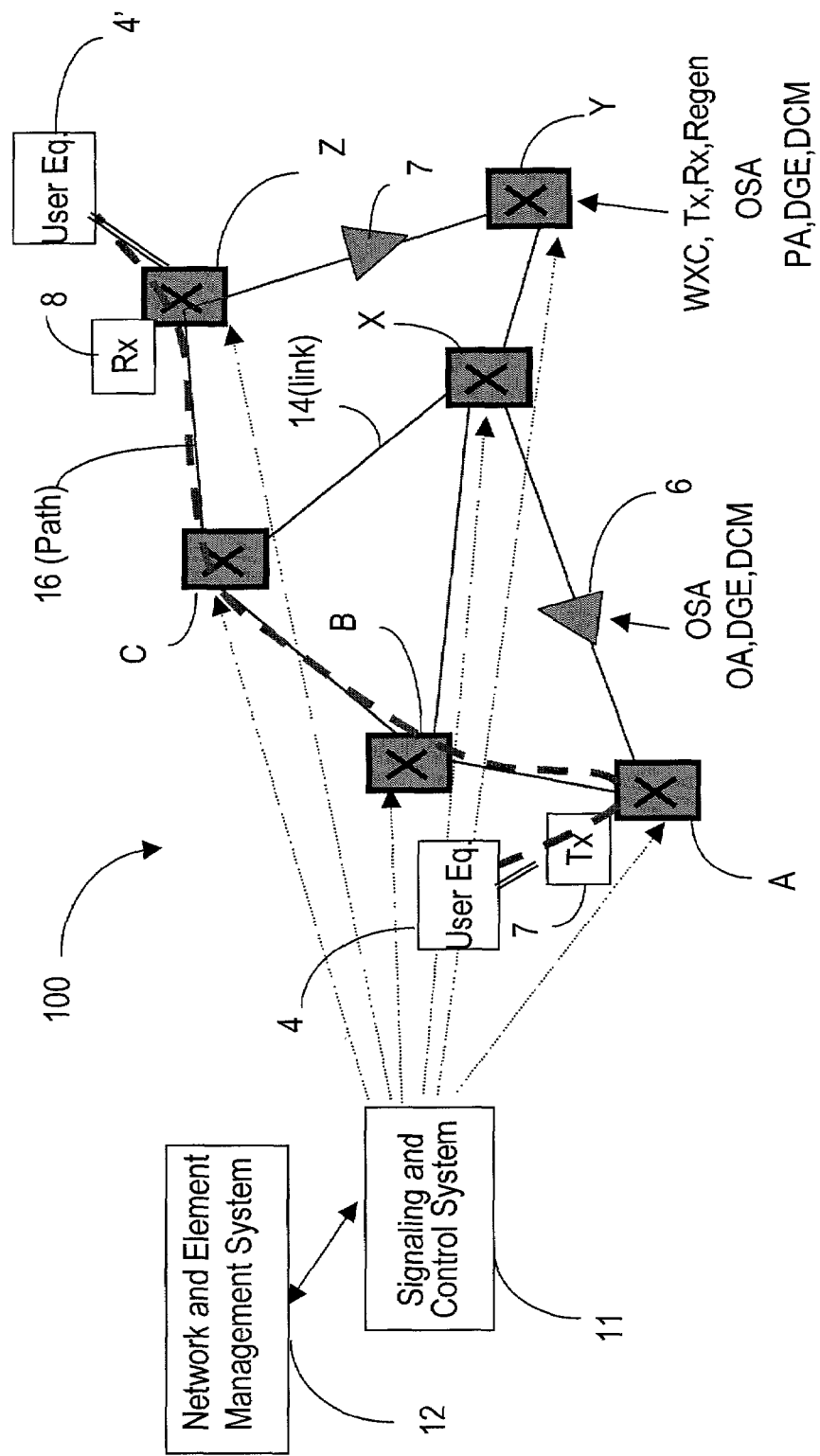
FIG. 1 shows an example of an agile system.

FIG. 1 shows an example of a transparent/agile (wavelength switched) network 100 as described in the above patent application. Network 100 includes a plurality of flexibility points (nodes) A, B, C, Z, X, Y equipped with wavelength switches, which can switch a channel in optical format, or with optical add/drop multiplexing OADM modules. Each node also comprises a pool of transponders (a long-reach Rx-Tx pair and a short reach Rx-Tx pair) for local traffic ramp-on/off, and a pool of regenerators/wavelength converters (a long reach Rx-Tx pair) for regenerating and/or converting the wavelength of some channels, based on their performance and network loading.

Network 100 is also provided with optical line amplification units 6, 7, for conditioning the WDM signal traveling along the respective link for ULR (ultra long reach) transmission. The line amplification units 6, 7, as well as the pre-amplifier units provided at the switching nodes, include optical amplifiers, which are preferably equipped with dynamic gain equalization means and dispersion compensation means. Dynamic gain equalizers ensure that an optimal power profile is maintained along the line. Dispersion compensation modules provide advanced fiber-based slope-matched dispersion compensation. Adjustable (tunable) can also be used in some instances, preferably at the switching nodes.

A plurality of multiple-port optical spectrum analyzers connected throughout network 100, provides visibility of signal power levels and noise levels.

Based on network topology information, resources availability and resources operational parameters, a network and element management system NEMS 12 monitors and controls operation of the network nodes and their connectivity, and provides node and network inventory data and various metrics. A signalling and control system SCS 11 is provided between all nodes and links of network 100 to allow topology discovery, fault monitoring, and photonic layer network management. SCS 11 also enables transferring of device specified and measured data from the respective device to various modules of the NEMS 12, and provides the devices with target operational parameters.

FIG. 1 shows an example of an agile network; the present invention applies to other agile network configurations. A connection A-Z is also shown by way of example.

The term 'connection' refers to transfer of traffic between nodes A and Z. The term 'path' refers to the route that carries the connection. For example, connection A-Z is established in FIG. 1 along a path 16 that originates at node A, passes through switching nodes B, C and arrives at the destination node Z in optical format. It is to be noted that connection A-Z can also be established along paths A-X-C-Z, or A-B-X-Y-Z, etc. In any event, network and element management system NEMS 12 selects the best path for the respective connection based on the current network topology, connectivity and loading.

The term 'link' refers to the fiber and equipment between two flexibility sites, such as shown at 14 in FIG. 1.

Figure 2:
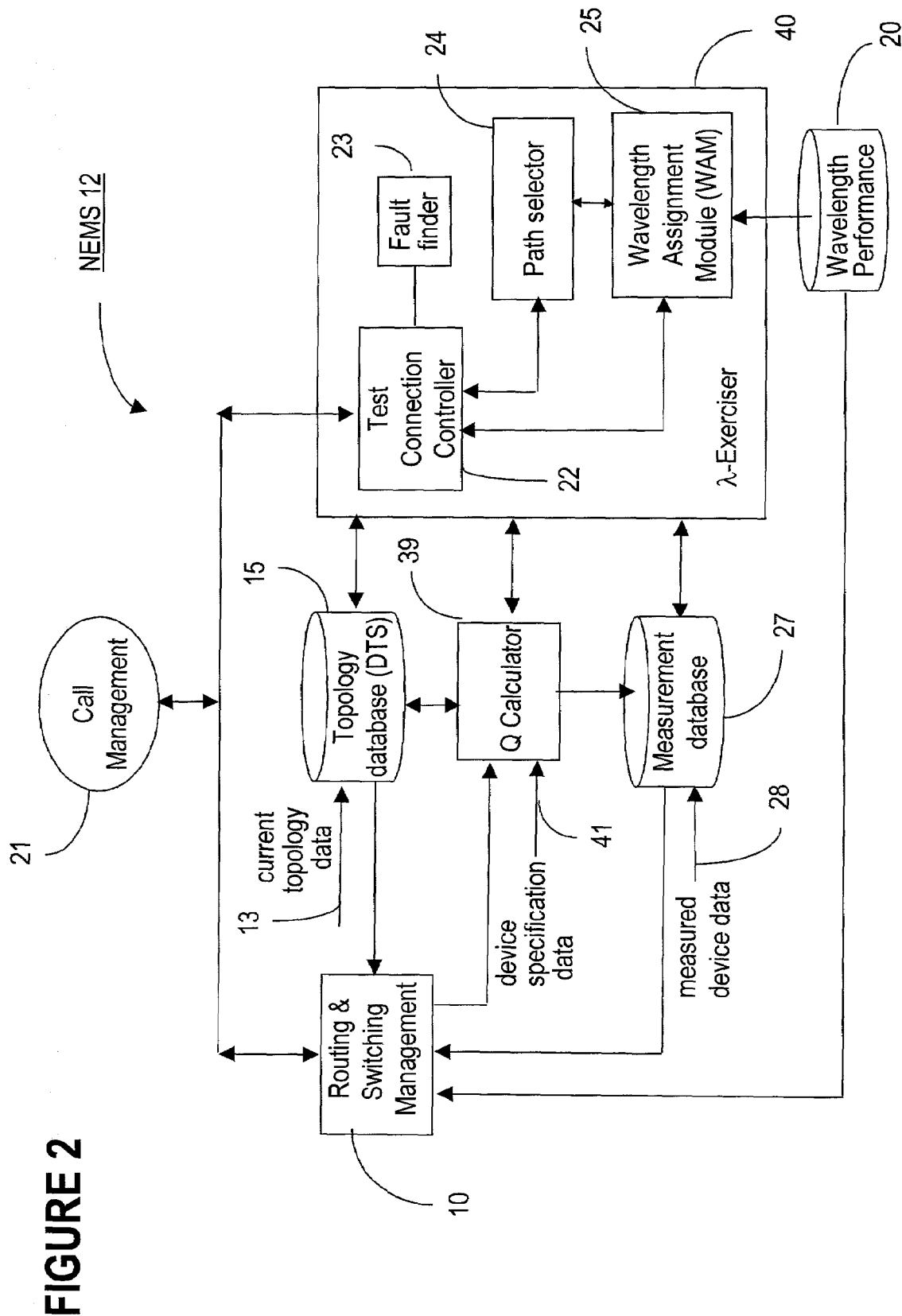
FIG. 2 shows an example of the units of a network and element management system involved in wavelength-connection mapping.

FIG. 2 illustrates a logical overview of the modules of the NEMS 12 which are involved in path selection and the operation of the wavelength exerciser 40 according to the invention.

For establishing a connection in network 100, the network and element controller 12 is provided with a call management block 21, which provides a routing and switching management 10 with a connection request. A request specifies the source node and the sink node (e.g. A and Z), imposes some constraints to the connection, and defines certain conditions according to the class of services applicable to the respective user. Unit 10 comprises a routing module that selects a plurality of best paths that satisfy the connection request, and a regenerator placement module, that places regenerators along these paths whenever needed. A wavelength assignment module of routing and witching management 10 assigns wavelengths to all regenerator segments.

RSM 10 also orders the path list according to their chances of success and maintains this list until a path is successfully setup. It presents the paths from the list one by one to the call management 21, which in turn attempts to set-up a path. If the first path on the list fails, the call management 21 requests the next path from the list, and so on, until the connection is setup.

The RSM 10 operates based on regenerator placement rules and constraints and on wavelength placement rules. The paths are selected based preferably on their cost and performance. To this end, the RMS 10 invokes a Q calculator 39 for calculating the Q for each regenerator segment, and for the entire path.

The wavelengths are also selected by RSM 10 according to their performance for the type of fiber used on the respective link, the launch power for the respective wavelength, etc, which information is available in database 20.

To enable full connectivity in network 100, NEMS 12 is provided with a topology database (data topology system DTS) 15 connected to all nodes of network 100 over signaling and control system SCS 11, as shown by interface 13. DTS 15 comprises updated information on network configuration and also comprises links to the specifications of the optical devices of network 100. The network configuration information includes, but is not limited to, network inventory information, connectivity information, information on current link loading, channel availability, etc. Device specifications (which may also include fiber specifications), include the operational parameters of the respective device as provided by the manufacturer and stored at the respective device.

FIG. 2 also shows a measurement database 27 which stores performance data measured at various points in network 100 and supplied over the signaling and control system 11, as shown by interface 28. The measured performance data includes measurements that are obtained from various network devices. For example, a transmitter Tx can provide the effective launch power for the respective wavelength. A receiver Rx can provide eye closure and BER information. Also, the receivers can measure dispersion of the respective regenerator section. The optical amplifiers OA may provide span gain/loss information, reflection measurements, noise figure, power levels, etc.

Measured performance data are also collected in various points of network 100 using optical spectrum analyzers OSA provided at switching nodes and amplifier sites. The OSA monitoring runs continuously to provide visibility of signal power levels and noise levels in the respective points.

Database 27 is generically illustrated as a centralized entity; however some of measured performance data can be stored at the respective device and the database 27 may provide a link to the respective information. As well, the measured performance data may be stored in DTS 15.

The Q calculator 39 is capable of extracting data for one or more channels, and calculating eye closure, nonlinear Q, WDM Q, OSNR Q and total Q. Much flexibility is offered regarding the complexity of processing, the way parameters are specified, or the type of graphical output that is generated. Once Q is below a threshold, signal regeneration is provided in the respective path, or the respective path is abandoned in favor of a new path that operates according to the user specification(s).

Figure 3:
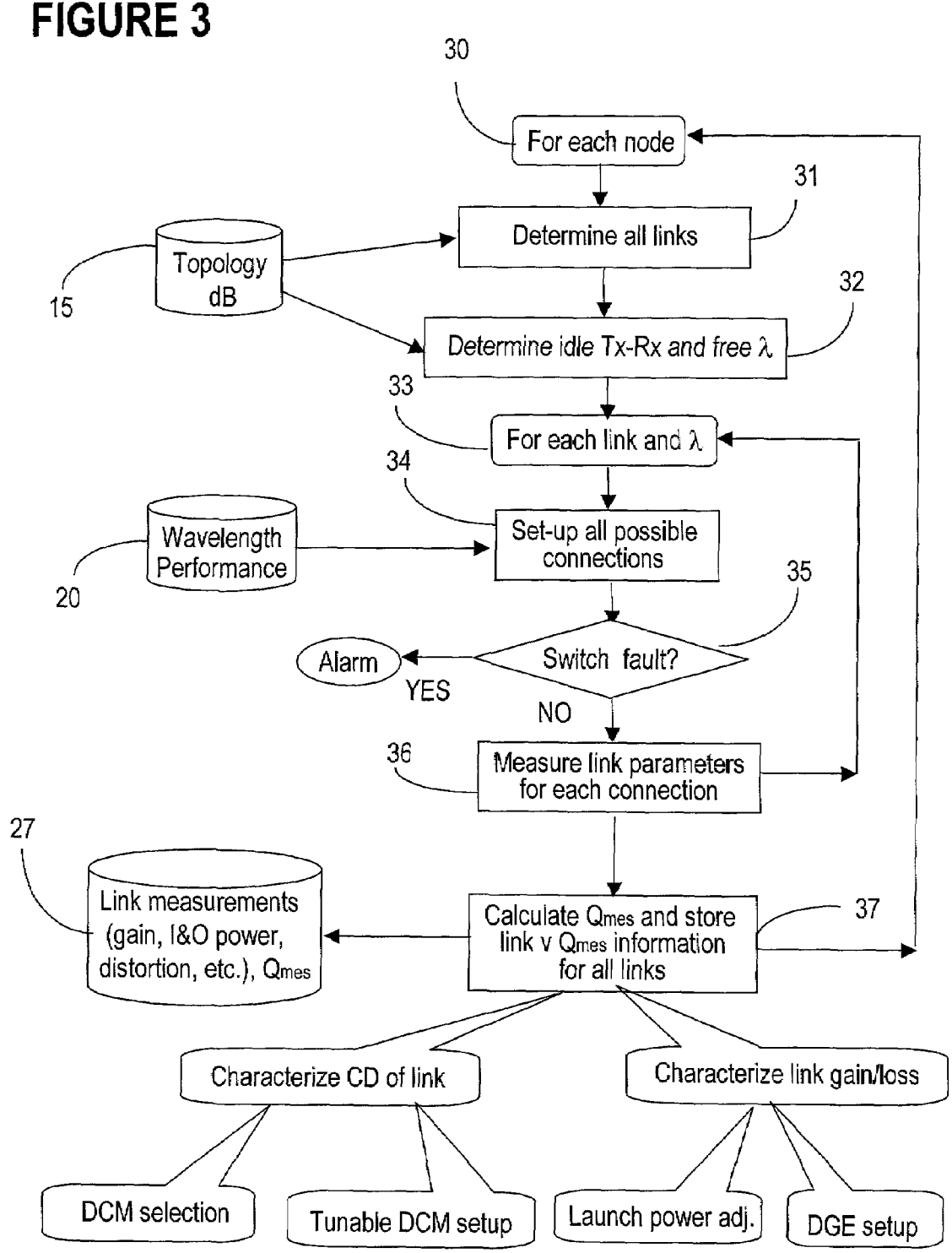
FIG. 3 is a flowchart showing the operation of the wavelength exerciser.

The wavelength exerciser (WE) 40 operates at each node of network 100 as described in connection with FIGS. 2 and 3. The exerciser can operate on-line, in which case it establishes test connections on un-used wavelengths, operating at scheduled intervals as a background task. As well, the exerciser can be used as part of SLAT (system line-up and test) to set-up all the connections in the network for network commissioning test. In both modes of operation, the exerciser can assume a plurality of roles in a network, such as:

1) To set-up test connections from each node to all other nodes of the network. In this role, the wavelength exerciser can detect faults in the switch and access architecture.

2) To collect performance data about all links of the network. In traditional networks, span engineering can be performed only during SLAT, at which stage measured data are not available. Experimental evidence shows that use of measured as opposed to estimated data might increase the network deployed reach by 50%. Thus, the measured performance data can be used to:

accurately calibrate the Q calculator 39. When path selection is based on the Q factor calculated using measured link/path data rather than estimated data, the chances of successfully setting-up a selected path increase significantly.

select the fixed dispersion compensating modules provided throughout the network. This provides a better control of the link dispersion, and ultimately a better quality signal at the receiver.

adjust the tuneable components of the network. In this way, additional optimization may be performed on each individual connection by adjusting the operational parameters of the respective path.

characterize the link gain/loss. This allows adjustment of the launch power and of the dynamic gain equalizers provided throughout the network. This also allows the link control to perform advanced power management by providing the gain and power targets for the control loops.

As seen in FIG. 2, the wavelength exerciser 40 comprises a path selector 24 and a wavelength assignment module 25 which operate under control of a test connection controller 22. The path selector 24 identifies all paths originating on a node, as shown by steps 30 and 31 in FIG. 3, and also identifies all idle transponders at that node and all wavelengths that are free at the respective time, step 32. This information is available from the topology database 15. A free wavelength is a wavelength that is not used for carrying live traffic at the time of testing, and an idle transponder is a transmitter-receiver pair, which is not generating or detecting optical signals at the time of testing.

The call manager 31 is then invoked to set-up connections on each link, step 33, using the wavelengths that are free on that link. This is performed as a background task in step 34.

The WE 40 also takes into account the wavelength performance for the respective link, available from wavelength performance database 20, so that only the wavelengths that have chances of establishing a connection are exercised. For example, if database 20 indicates that reach of wavelength λ1 is under 1,000 Km, and the link/path under control is longer than that, wavelengths λ1 would not be tested on this particular link/path.

If the call manager 21 cannot setup a certain wavelength on the respective link, a fault is signaled, as shown on the YES branch of decision block 35. The wavelength exerciser is provided with a fault finder 23, which can give a good indication of the location of the fault.

Thus, if the test connection is to be established between two consecutive nodes, the exerciser will verify the access structure. In this case, the route for the respective test connection passes at the source node from the transmitter through the add structure to the postamplifier, then over the fiber link including the optical amplifiers to the destination node. At the destination node, the route will pass through the preamplifier and the drop structure to the respective receiver. Since each wavelength may be directed in the drop structure along a different route depending on which receiver is allocated to the connection and the wavelength used for the test connection, WE 40 will test for continuity and connectivity along different branches of the drop structure.

If the connection is established over a passthrough node, the exerciser can verify the architecture of the passthrough switch. The connection can be transferred from the same input port of the switch to a plurality of output ports in turn, depending on the wavelength used for the respective connection, to verify the continuity of the internal switch routes. Again, when the testing is performed on-line, only the switch internal routes not used by live connections are verified at the time of testing.

It is to be noted that in an agile network 100 the connectivity map of the switches/network changes in time, due to the dynamic set-up and removal of connections based on the current user requests. In this way, all paths have a chance to be tested under various network loading conditions after a certain time.

WE 40 may also drive in-service measurements of a variety of parameters, step 36, such as dispersion, gain/loss, input and output power, reflection information. Other parameters may also be measured, if necessary. The Q calculator 39 then determines the Q factor for each link and other associated parameters, shown at step 37. The results can be recorded in measurement database 27.

Routing management 10 may use the link performance data collected by the wavelength exerciser subsequently for path selection. Since the path performance is in this case calculated based on current, measured parameters, the path-set-up time is significantly reduced, while the chances of successfully setting the connection along the respective selected path increase significantly.

The wavelength paths that are set-up by the exerciser can additionally be used to optimize parameters that require long path measurements.

For example, WE 40 can be used to characterize the chromatic dispersion CD of the link in the unused channel slots. This allows for better understanding of the CD of the system, which in turn allows for a more accurate selection of the fixed dispersion compensating modules provided in the transmission line at the optical amplifier sites. More importantly, the WE 40 provides feedback for any tunable dispersion compensation placed in the pre-amplifiers at the flexibility sites.

WE 40 can also be used to characterize the link gain/loss. This information can be used for optimizing parameters such as launch power into the fiber, wavelength tolerance/tuning, etc. Also, WE 40 can be used to set-up the best value for the dynamic gain equalizers (DGE) provided along the link at the amplifier sites. By setting-up the attenuation of the DGE, the best set-point for a new live channel is determined faster after the channel is added. The DGE value can be determined using alternative techniques; however use of the WE 40 provides the most accurate view of the required attenuation setting.

We claim:

1. A method for evaluating connections in an agile network comprising:
   (a) for a switching node of said agile network, selecting a plurality of paths available between said switching node and all remaining nodes of said agile network;
   (b) for an available path, selecting a plurality of wavelengths according to a wavelength performance parameter;
   (c) for each selected wavelength, establishing a test connection along said path; and
   (d) at preset intervals, repeating step (c) for all selected wavelengths, repeating steps (b) and (c) for all available paths, and repeating steps (a), (b) and (c) for all nodes of said agile network.

2. A method as claimed in claim 1, wherein said plurality of wavelengths are wavelengths that can reach a respective remaining node.

3. A method as claimed in claim 1, performed with live traffic over said network.

4. A method as claimed in claim 1, wherein said plurality of wavelengths are wavelengths that can reach a respective remaining node and are not used for live traffic.

5. A method as claimed in claim 1, wherein said step (c) comprises providing an alarm whenever said test connection cannot be established along said path.

6. A method as claimed in claim 5, wherein said alarm identifies the location of a fault at one of an add structure of said switching node and a drop structure of said other node.

7. A method as claimed in claim 5, wherein said alarm identifies the location of a fault at a switch passed through by said test connection.

8. A method as claimed in claim 1, wherein said step (c) comprises measuring a performance parameter of said path and storing said performance parameter in a measurement database, whenever said test connection is established along said available path.

9. A method as claimed in claim 8, further comprising calibrating a Q calculator based on said measured performance parameter.

10. A method as claimed in claim 8, further comprising adjusting a tunable parameter of an optical device of said available path based on said performance parameter.

11. A method as claimed in claim 8, further comprising setting a target parameter for one or more optical devices of said available path based on said performance parameter.

12. A method as claimed in claim 8, further comprising provisioning an optical device of said path which has a fixed parameter selected based on said performance parameter.

13. A network and element management system for a wavelength switched optical network comprising:
    at a switching node, a wavelength exerciser for detecting a test path between said switching node and another switching node and for assigning a plurality of wavelengths to said test path;
    a call management module for setting up a connection along said test path; and
    a Q calculator for determining the Q factor of said test connection.

14. A system as claimed in claim 13, further comprising a database for storing the Q factor of said test connection.

15. A system as claimed in claim 13, further comprising a database for storing a set of performance parameters of said test connection, collected by a plurality of optical devices in said test path.

16. A system as claimed in clam 13, wherein said call manager sets-up a live connection along a selected path based on a connection request, and sets-up said test connection as a background task on request from said wavelength exerciser.

17. The wavelength exerciser as in claim 13 comprising:
    a path selector for selecting the test path;
    a wavelength assignment module for assigning successively the plurality of wavelengths to said test path for establishing the test connection along said test path;
    a fault finder for detecting a fault whenever said test connection fails.

18. The wavelength exerciser as in claim 17 wherein:
    the path selector selects the test path based on cost and performance factors.

\* \* \* \* \*